US007541704B2

(12) United States Patent
Huck et al.

(10) Patent No.: US 7,541,704 B2
(45) Date of Patent: Jun. 2, 2009

(54) ELECTRIC MACHINE INCLUDING A BRUSH-HOLDER SUPPORT HAVING FLEX FOIL, AS WELL AS A METHOD FOR PRODUCING A BRUSH-HOLDER SUPPORT

(75) Inventors: Thomas Huck, Rheinmuenster (DE); Lars-Dirk Anding, Nagold (DE)

(73) Assignee: Robert Bosch GmbH, Stuttgart (DE)

( * ) Notice: Subject to any disclaimer, the term of this patent is extended or adjusted under 35 U.S.C. 154(b) by 491 days.

(21) Appl. No.: 11/302,572

(22) Filed: Dec. 13, 2005

(65) Prior Publication Data

US 2006/0158057 A1 Jul. 20, 2006

(30) Foreign Application Priority Data

Dec. 13, 2004 (DE) ...................... 10 2004 059 912

(51) Int. Cl.
*H02K 5/00* (2006.01)

(52) U.S. Cl. ........................ 310/68 B; 310/71; 310/239

(58) Field of Classification Search ................... 310/71, 310/DIG. 6, 68 B, 239
See application file for complete search history.

(56) References Cited

U.S. PATENT DOCUMENTS 4,661,733 A * 4/1987 Heyraud ................... 310/68 R
5,528,093 A * 6/1996 Adam et al. .................. 310/89

* cited by examiner

*Primary Examiner*—Dang D Le
(74) *Attorney, Agent, or Firm*—Kenyon & Kenyon LLP

(57) ABSTRACT

An electric machine includes brushes and a brush-holder support in which an electrical connection of components of the brush-holder support is realized with the aid of a flex foil. Furthermore, a method for producing a brush-holder support for an electric machine.

17 Claims, 1 Drawing Sheet

ELECTRIC MACHINE INCLUDING A BRUSH-HOLDER SUPPORT HAVING FLEX FOIL, AS WELL AS A METHOD FOR PRODUCING A BRUSH-HOLDER SUPPORT

BACKGROUND INFORMATION

Electric machines in various embodiments are known from the related art. Electric machines are used in motor vehicles, for instance as electromotors for comfort drives such as window raiser motors or sliding roof motors or motors for seat adjustment, etc. Such motors must have the smallest possible dimensions, low weight and a long service life, if possible. Brush motors having a brush-holder support to hold the brushes have proven especially useful in this context. Therefore, starting from a plug connector, a brush-holder support also includes lines to supply the electric current to the brushes. Modern brush motors in the window-raiser context normally include a sensor system, in particular in the form of Hall-effect sensors, to record the rotational speed of the armature of the motor. This information is utilized to determine, in particular, the position of the electrically adjusted component, i.e., the window or the sliding roof or the seat. Such sensors and additional resistors and interference suppressors are provided at the brush-holder support as well for which purpose additional lines must be provided on the brush-holder support. Conventional brush-holder supports that include a sensor array therefore have five or six plug pins and, correspondingly, six lines as well. It has already been suggested in this context to place the additional sensor components on a circuit board which is then affixed on the brush-holder support in the form of a subassembly. This solution is relatively cost-intensive, however, in particular due to the production of the circuit board. Moreover, it is often difficult or may be managed only at considerable construction expense to position the Hall-effect sensors in the desired locations in the motor if they are mounted on a circuit board. The accuracy of the sensors may thus be less than optimal.

Furthermore, it was suggested to provide a pressed screen on the brush-holder support on which the corresponding components are mounted, using welding technology, for example. However, this solution requires costly insertion technology for the brush-holder supports, which are normally provided as injection-molded parts, and additional expense for the welding operation.

SUMMARY OF THE INVENTION

The electric machine according to the present invention provides the advantage of having a brush-holder support which has an especially compact design and is able to be manufactured very cost-effectively. In accordance with the present invention, a brush-holder support which establishes an electrical connection realized by a flex foil is provided between the components on the brush-holder support for this purpose. Within the context of the present invention flex foil is understood to denote a flexible foil which is bendable in all directions and able to establish an electrical connection. Elements forming a line are preferably integrated into the flex foil. A flex foil may have one or a plurality of line-forming elements.

The flex foil of the brush-holder support preferably provides an electrical connection between a plug element formed on a brush-holder support and electric components on the brush-holder support. The plug element is preferably integrally formed with the actual brush-holder support.

In addition, electronic components are preferably situated on the flex foil.

The electronic components on the flex foil are preferably a Hall-effect sensor and/or a resistor and/or an interference-suppressing component such as a capacitor, a reactance coil, a varistor, an electronic circuit and/or a thermostatic switch. The flex foil thus simultaneously also acts as holding or support element for additional electronic components. This allows the flex foil to assume the function of a circuit board as well, without the space-related disadvantages of a circuit board.

It is also preferred if the flex foil is connected to the brushes held by the brush-holder support and carries the motor currents between a plug connection and the brushes. In this way the flex foil is able to provide all necessary electrical connections on the brush-holder support.

According to another preferred embodiment of the present invention the flex foil is partially extrusion-coated onto the material of the brush-holder support. Plastic is normally used as material for the brush-holder support. Due to the partial extrusion-coating of the flex foil, a partial fixation of the flex foil in the brush-holder support is thus achieved. The flex foil is preferably extrusion-coated in the region of the plug element of the brush-holder support. The plug pins, which are contacted on the flex foil at least for the sensor components, are thus able to be injected in a waterproof manner.

To allow an especially cost-effective manufacture, the additional components are affixed on the flex foil utilizing SMD technology (surface mounted device). In this way the flex foil according to the present invention can be fitted with additional electronic components in a particularly cost-effective manner.

Furthermore, the brush-holder support preferably has at least one receiving pocket in which the electronic components mounted on the flex foil are able to be accommodated. In particular the Hall-effect sensors are accommodated in the receiving pockets, thereby allowing an exact positioning of the Hall-effect sensors on the brush-holder support. The flexibility of the flex foil provides a simple installation process for the positioning of the electronic components in the receiving pocket.

The method according to the present invention for producing a brush-holder support for an electric machine is implementable in a particularly cost-effective manner. According to the method of the present invention, a flex foil is first placed in a die mold for the brush-holder support, and the flex foil is partially extrusion-coated during the injection-molding operation for the brush-holder support. The partial extrusion-coating is carried out, in particular, in the region of the flex foil where the plug connection for the brush-holder support is to be formed. This not only achieves fixation of the flex foil in a region of the flex foil but, due to the flexibility of the flex foil, still allows additional electronic components to be mounted on the flex foil in an uncomplicated manner following the partial extrusion coating.

In an especially preferred manner, the additional electronic components are affixed on the flex foil with the aid of an SMD method, which is able to be implemented in a particularly cost-effective manner. The fitting of the electronic components on the circuit board may also even be done prior to the injection-molding operation. Furthermore, the method according to the present invention offers great flexibility with respect to a fitting of different electronic components, so that the brush-holder support according to the present invention may easily be used for a broad range of application areas such as different electric motors in the vehicle that have to meet different specifications.

Since the use of electric comfort drives in modern vehicles will continue to increase, the present invention offers considerable cost advantages because electric motors of this type are produced as mass production components. Furthermore, the present invention allows a simple adaptation to different specifications of individual vehicle manufacturers.

DETAILED DESCRIPTION

In the following, an electric machine according to the present invention is shown with reference to FIGS. 1 and 2.

Figure 1:
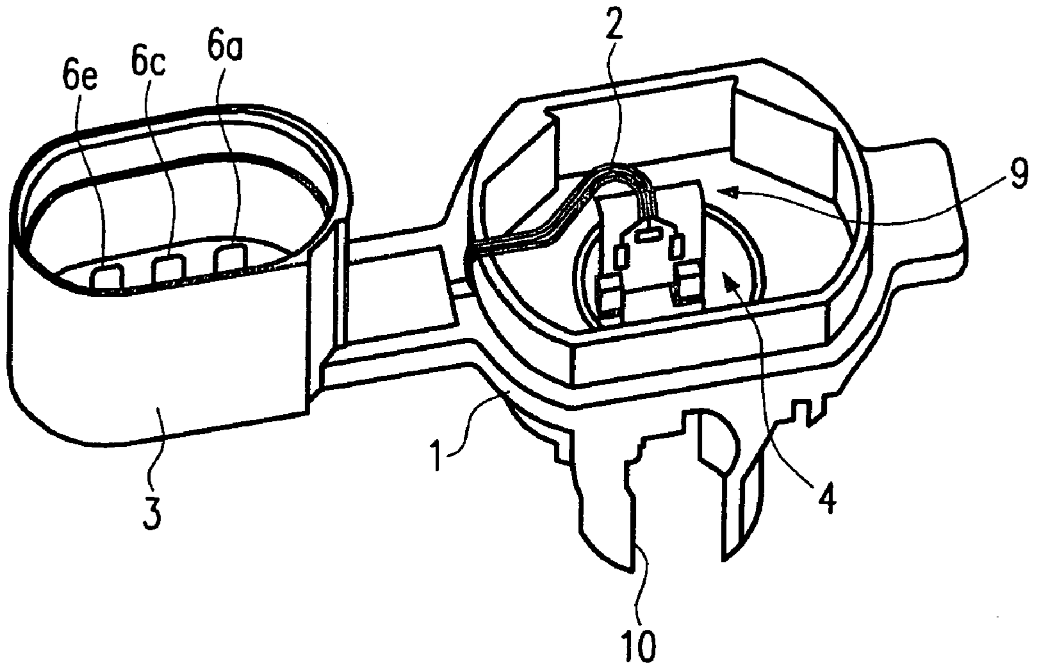
FIG. 1 shows a schematic, perspective view of a brush-holder support according to an exemplary embodiment of the present invention.

FIG. 1 shows a perspective view of a brush-holder support 1 which is positioned in an electromotor between a pole housing (not shown) and a gear housing (not shown). The pole housing is connected to the gear housing of the electromotor via brush-holder support 1, in such a way that the brush-holder support is positioned between the two housings. Brush-holder support 1 is made of plastic and includes a plug 3 which is integrally formed with brush-holder support 1. Plug 3 is formed as six-pole plug having six plug pins 6*a*, 6*b*, 6*c*, 6*d*, 6*e*, 6*f* (cf. FIG. 2) and projects laterally beyond the two housings in the installed state. Brush-holder support 1 has an annular formation 10 to receive an armature shaft (not shown) of the motor. Carbon brushes 4 are also arranged in the region of protuberance 10 on the brush-holder support.

Figure 2:
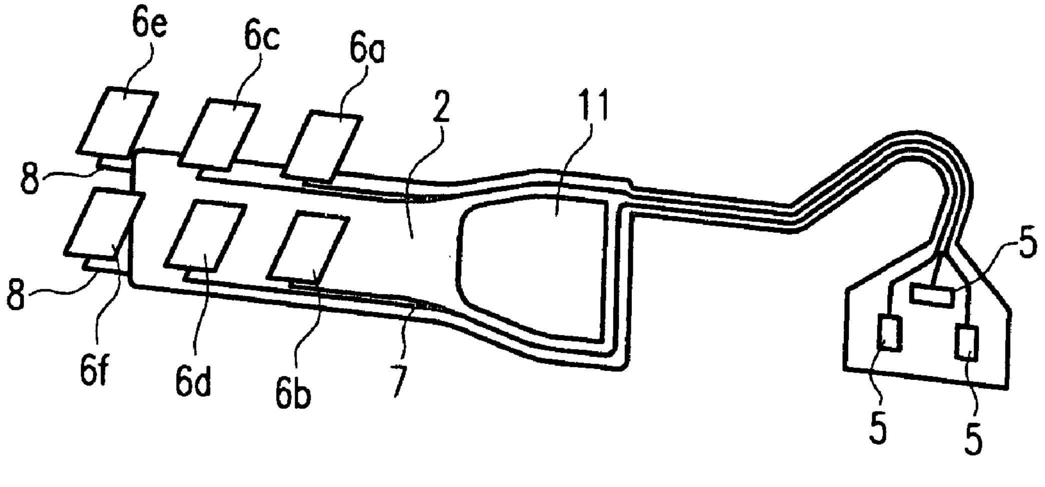
FIG. 2 shows a schematic representation of the flex foil in the installed state, the components surrounding the flex foil not being illustrated for reasons of clarity.

In addition, brush-holder support 1 according to the present invention includes a flex foil 2, which is schematically shown in FIG. 2 in the non-extruded state. Flex foil 2 is a flexible foil which is bendable in all directions and has lines 7 to provide an electrical connection between the plug pins and electric or electronic components 5. Electric or electronic components 5 are mounted on flex foil 2 and may be mounted on flex foil using standardized assembly or soldering technology. Components 5 are, for instance, Hall-effect sensors which may be applied on the flex foil by means of SMD technology. Such SMD Hall-effect sensors are considerably cheaper than wired Hall-effect sensors. As illustrated in FIG. 2, the end of flex foil 2 is slightly broader, so that components 5 are able to be positioned on the flex foil in a flexible manner. In particular the Hall-effect sensors are thus able to be flexibly placed in a suitable position relative to a sensor magnet of the motor.

As can be gathered from FIG. 1, flex foil 2 and plug pins 6 are extrusion-coated in the region of plug 3 in a waterproof manner, flex foil 2 being injection-molded only up to the region of a plug collar. The region in which flex foil 2 is injection-molded can be seen in FIG. 2, where the width of flex foil 2 changes. In addition, a recess 11 through which affixation elements for affixing the pole housing to the gear housing are able to be guided is provided in flex foil 2. Furthermore, recess 11 is used as free space for the welding of contacts.

For easier and faster positioning of flex foil 2, receiving pockets 9 which accommodate the flex foil or components 5 affixed on flex foil 2 have been formed in brush-holder support 1. The provision of such receiving pockets 9 in brush-holder support 1 ensures rapid and positionally accurate installation of flex foil 2.

As illustrated in FIG. 2, two plug pins 6*e* and 6*f* are provided to supply the motor current to carbon brushes 4, an individual motor current line 8 being provided from each plug pin 6*e* or 6*f* for this purpose. These motor current lines 8 may also be integrated in flex foil 2. However, both motor current lines 8 can also be connected to the carbon brushes separately, with the aid of a pressed screen or individual contact strips which are injection-molded into brush-holder support 1.

As a result, prior to installation in the brush-holder support, electric or electronic components 5 may advantageously be fitted on flex foil 2 according to the present invention, for which cost-effective, standardized methods are able to be used. Plug pins, too, may be affixed on flex foil 2 in the process.

Since brush-holder support 1 is usually injection-molded from plastic, complicated insert contours or involved tool technology during the injection-molding are no longer needed when using the flex foil according to the present invention. However, the region of the flex foil provided with the plug pins is advantageously extrusion-coated with plastic during production of brush-holder support 1, which not only results in a secure fixation of flex foil 2, but also in sealing of the brush region of the brush-holder support with respect to the plug region. Flex foil 2 may be installed inside the brush-holder support in the tightest installation space and be arranged in different planes and directions. This makes it possible to utilize even standardized flex foils for brush-holder supports of different designs. Furthermore, the flexible installation using the flex foil is possible in even smaller spaces, thus providing high functionality in particular with respect to the sensor function of the brush-holder support.

Furthermore, the use of flex foil 2 improves the quality in the production since the clearances of current-conducting lines 7 on flex foil are predefined and not subject to, for instances, changes caused by the injection process or insert contours when the lines are placed in the die mold prior to the injection operation. In addition, the manufacture becomes less expensive since a multitude of different inserts may be dispensed with during the injection-molding operation.

It should be noted that the present invention also makes it possible to use a plurality of flex foils in a brush-holder support in order to obtain greater flexibility, in particular with respect to different application specifications. In addition, it is also possible to use a partially slotted flex foil, so that a plurality of flex foil regions are produced that are able to be arranged as desired and connected via a shared region, the shared region being injection-molded into the brush-holder support in an especially preferred manner.

What is claimed is:

1. An electric machine comprising:

brushes;

a brush-holder support;

a flex foil for providing an electrical connection of components of the brush-holder support; and a receiving pocket formed in the brush-holder support for accommodating at least one of the flex foil and the components of the brush-holder support, wherein the components are flexibly arranged on the flex foil in a flexible position relative to the electric machine.

2. The electric machine according to claim 1, further comprising a plug element integrally formed with the brush-holder support, the plug element being situated on the brush-holder support, the flex foil providing an electrical connection between at least one plug pin of the plug element and components of the brush-holder support, the components being at least one of electric and electronic.

3. The electric machine according to claim 2, wherein the components are situated on the flex foil.

4. The electric machine according to claim 3, wherein the components include at least one of a Hall-effect sensor, a resistor, an interference suppressor, an electronic circuit and a thermostatic switch.

5. The electric machine according to claim 3, wherein the components are affixed on the flex foil with the aid of an SMD process.

6. The electric machine according to claim 3, wherein the brush-holder support has a receiving pocket for accommodating at least one of the flex foil and the components which are affixed on the flex foil, in order to allow positioning of at least one of the flex foil and the components.

7. The electric machine according to claim 2, wherein the flex foil, in a region of the plug element, is at least partially extrusion-coated by a material of at least one of the brush-holder support and the plug element.

8. The electric machine according to claim 1, wherein the flex foil provides an electrical connection between the brushes supported by the brush-holder support and plug pins to carry a motor current to the brushes.

9. The electric machine according to claim 1, wherein: integrated in the flex foil are lines to provide the electrical connection; and the flex foil is affixed on the brush-holder support.

10. The electric machine according to claim 9, wherein the electric machine is an electromotor.

11. The electric machine according to claim 9, wherein the flex foil is inserted in a die mold of the brush-holder support and partially injection-molded by a material of the brush-holder support.

12. The electric machine according to claim 9, wherein, prior to a partial injection-molding of the flex foil, components are mounted on the flex foil using an SMD process, the components being at least one of electric and electronic.

13. The electric machine according to claim 12, wherein the components include at least one of a Hall-effect sensor, a resistor, an interference suppressor, an electronic circuit and a thermostatic switch.

14. The electric machine according to claim 1, wherein the electric machine is an electromotor.

15. The electric machine according to claim 1, wherein the flex foil is inserted in a die mold of the brush-holder support and partially injection-molded by a material of the brush-holder support.

16. The electric machine according to claim 1, wherein, prior to a partial injection-molding of the flex foil, components are mounted on the flex foil using an SMD process, the components being at least one of electric and electronic.

17. The electric machine according to claim 16, wherein the components include at least one of a Hall-effect sensor, a resistor, an interference suppressor, an electronic circuit and a thermostatic switch.

* * * * *